May 15, 1923.

H. G. KELLOGG

WINDOW FRAME

Filed March 5, 1921

1,455,340

Inventor
Homer G. Kellogg

By Whittemore Hulbert Whittemore
+ Belknap    Attorneys

Patented May 15, 1923.

1,455,340

UNITED STATES PATENT OFFICE.

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK.

WINDOW FRAME.

Application filed March 5, 1921. Serial No. 449,665.

*To all whom it may concern:*

Be it known that I, HOMER G. KELLOGG, a citizen of the United States of America, residing at Detroit, in the county of Wayne and State of Michigan, have invented certain new and useful Improvements in Window Frames, of which the following is a specification, reference being had therein to the accompanying drawings.

The invention relates to window frames more particularly designed for use in motor vehicle construction, as, for instance, for the stationary section of the windshield in a closed body car. It is the object of the invention to obtain a simple construction which may be formed from sheet metal and which will form a weatherproof joint with the adjacent portions of the body and to this end the invention consists in the structure as hereinafter set forth.

Figure 1:
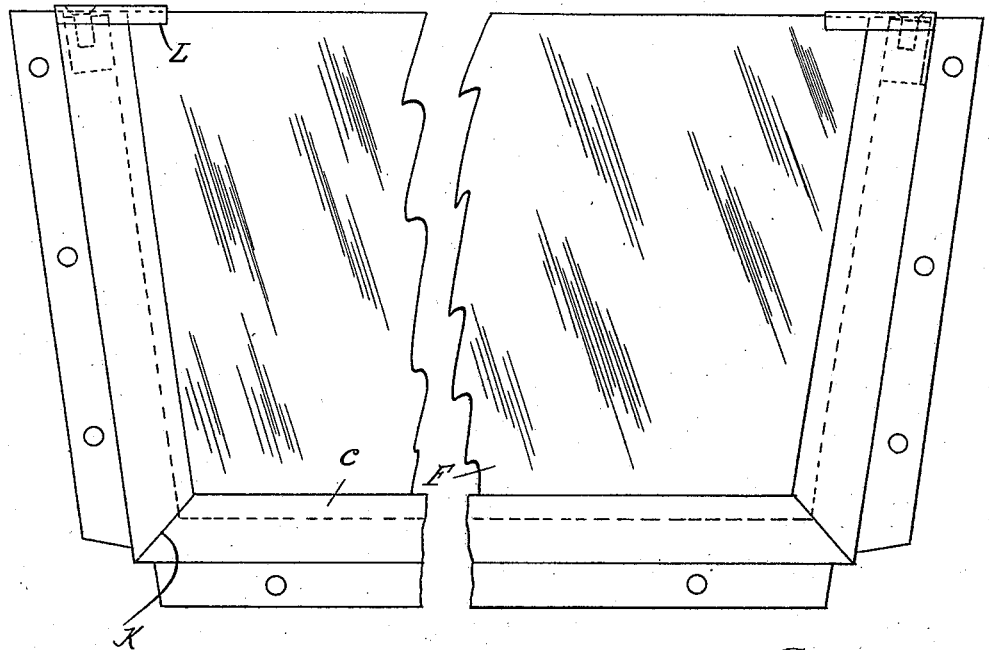
Figure 1 is a front elevation of the frame.
Figure 2:
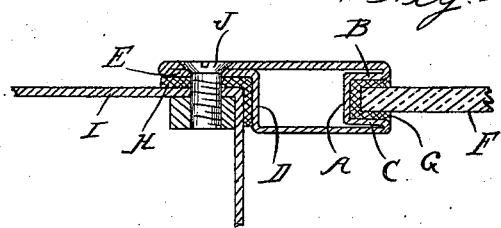
Figure 2 is a cross-section through one of the frame rails showing the manner of securing the same to the post.

My improved frame is preferably composed of separate side and end rails, each being formed up from sheet metal. Each of these rails comprises an open return-bent portion A forming a channel for receiving the glass, reversely close return-bent portions B and C forming parallel front and rear walls of the frame, and a rabbet portion D formed by a right angle bend in the portion C and a portion E parallel and adjacent to the wall B. The glass F is inserted in the groove of the channel A, being separated therefrom by the cushioning strip G of felt or other suitable material. There is also a cushioning and sealing strip H of felt or some material which is placed in the rabbet D and fits against the post I or other part of the vehicle body to which the frame is attached. The parallel flanges E and B are apertured for the passage of securing screws J, said apertures being suitably countersunk for the reception of the heads of the screws so as to form a flush joint.

The rails constructed as described are jointed to each other by mitered or bevelled edges K, which may be welded or otherwise attached to each other. The glass is slipped into the channel in the member A and is then secured by a cap piece L.

What I claim as my invention is:

A window frame for motor vehicles comprising side and end rails, each of said rails being formed from sheet metal and having a longitudinally extending portion for receiving an edge of a transparent element, said longitudinally extending portion being U-shape in cross-section, each rail also having rearwardly extending portions bent close upon the sides of said longitudinally extending portion and forming spaced parallel walls, one of said walls having a portion bent at right angles and abutting the other wall intermediate the ends thereof, the first mentioned wall also having a portion extending at right angles from the angular extending portion aforesaid and extending longitudinally of the other wall to the end thereof in contacting relation, the longitudinally extending contacting portions being provided with registering apertures for the passage of devices for securing the body of said vehicle to said frame.

In testimony whereof I affix my signature.

HOMER G. KELLOGG.